W. J. LAWTON.
LINING FOR BRAKE BANDS.
APPLICATION FILED JUNE 14, 1917.

1,270,959.

Patented July 2, 1918.

INVENTOR
William John Lawton,
By Morsell, Keeney & French,
ATTORNEYS

UNITED STATES PATENT OFFICE.

WILLIAM JOHN LAWTON, OF GENOA JUNCTION, WISCONSIN.

LINING FOR BRAKE-BANDS.

1,270,959.     Specification of Letters Patent.     Patented July 2, 1918.

Application filed June 14, 1917. Serial No. 174,645.

*To all whom it may concern:*

Be it known that I, WILLIAM JOHN LAWTON, a citizen of the United States, and resident of Genoa Junction, in the county of Walworth and State of Wisconsin, have invented new and useful Improvements in Linings for Brake-Bands, of which the following is a description, reference being had to the accompanying drawings, which are a part of this specification.

The invention relates to linings for brake bands, more particularly adapted for brake bands for light automobiles especially the Ford automobile.

Usually the brake lining for the brake bands of Ford automobiles consists of a plain circular band which generally takes hold of the brake wheel suddenly causing the car to jerk or does not take hold at all. To obviate these difficulties I have devised a brake-lining having portions thereof spaced away from the band to form a polygonal figure such as an octagon or hexagon with flat sides with the result that as the brake band is tightened around the brake wheel it will be gradually applied.

The invention is further designed to provide a brake lining for a band brake with a plurality of yielding spaced apart spacing members to form a lining having yielding flat sides which will be gradually compressed as the brake band is tightened and thereby gradually apply the brake.

The invention further consists in the several features hereinafter set forth.

Figure 1:
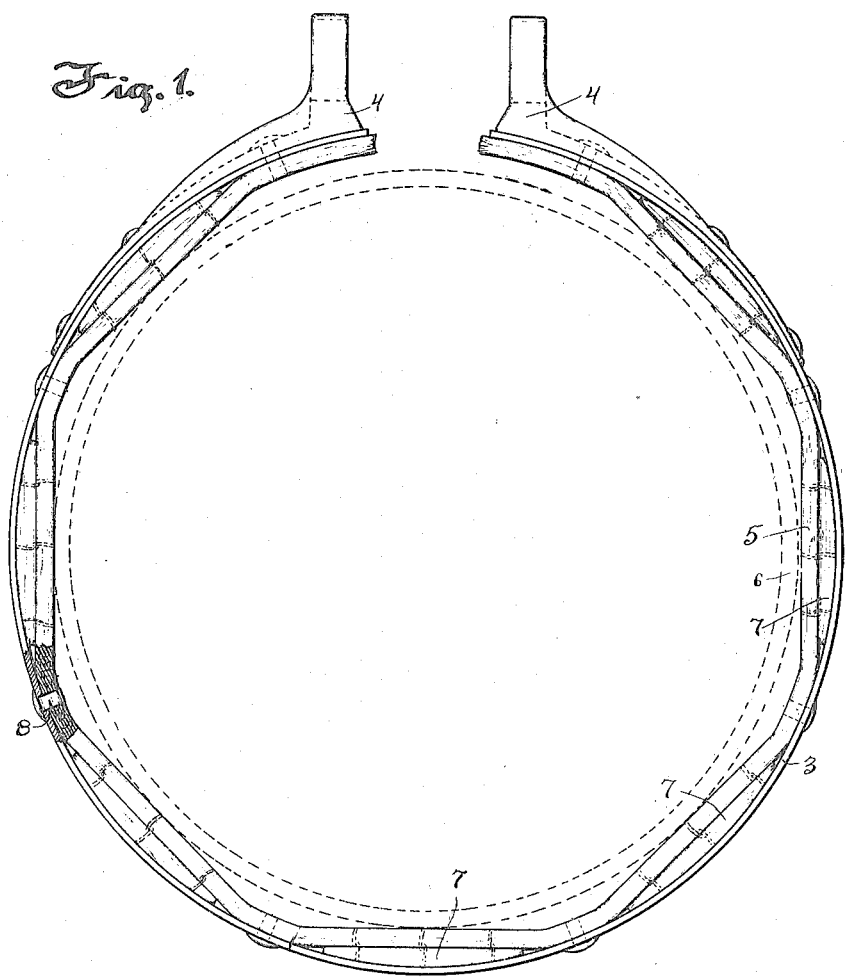
Figure 1 is a view of the device embodying the invention applied to the brake band.
Figure 2:
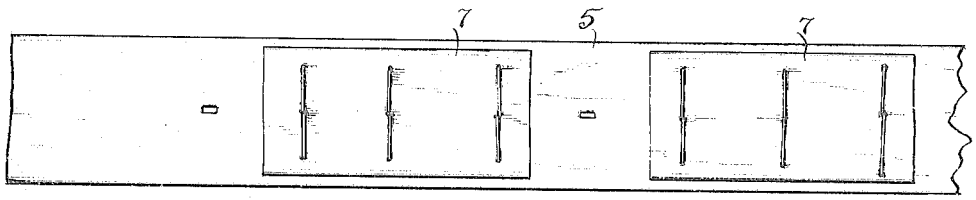
Fig. 2 is a detail view of the inner side of the brake lining.

In Fig. 1 of the drawings I have shown the usual brake band for a Ford automobile consisting of metal band 3 carrying lugs 4 which are adapted to be pulled together or spread apart by well known pedal operated mechanism which does not constitute a part of the present invention. The numeral 5 designates the brake lining as a whole and 6 shows the brake wheel in dotted lines against which the brake band is applied.

The brake lining consists of a strip of fabric and secured to the inner side thereof at certain distances apart are a plurality of spacing members or pads 7. These pads may be made of fabric such as lamp wick material or may be of cork or other compressible material. The lining thus constructed is secured to the brake band 3 at intervals between the pads 7 by any suitable fastening means such as rivets 8.

In securing the lining to the band it is preferably drawn down so that the inner side of the band forms a polygonal figure with straight sides. In the present instance I have shown the inner side connected to the band to form an octagonal shaped figure though it will be understood that other polygonal forms could be used.

With this construction when pressure is brought to bear on the lugs 4 by the usual pedal control mechanism (not shown) the ends of the band 3 are drawn together and the brake lining is drawn up against the wheel 6 at first contacting with the middle portions of the straight sides and then gradually compressing the pads 7 and gripping the brake wheel throughout its periphery and thus causing a gradual application of the brake with the elimination of sudden jars or shocks which are annoying to the occupants of the automobile and which tend to loosen the parts of the automobile.

What I claim as my invention is:

1. The combination, with a brake band, of a lining therefor consisting of a strip of fabric provided with a plurality of fabric pads disposed between the strip and the brake band and spaced apart from each other, and means for securing said lining to the brake band at points between the pads to form an inner contacting surface of polygonal shape.

2. The combination, with a brake band, of a lining therefor consisting of a strip of fabric provided with a plurality of pads of compressible material disposed between the strip and the brake band and spaced apart from each other, and means for securing said lining to the brake band at points between the pads to form an inner contacting surface of polygonal shape.

In testimony whereof, I affix my signature.

WILLIAM JOHN LAWTON.